United States Patent [19]

Chang et al.

[11] Patent Number: 5,572,597

[45] Date of Patent: Nov. 5, 1996

[54] FINGERPRINT CLASSIFICATION SYSTEM

[75] Inventors: Chung-Fu Chang; Edward E. Hilbert, both of Litchfield Park, Ariz.

[73] Assignee: Loral Corporation, New York, N.Y.

[21] Appl. No.: 468,832

[22] Filed: Jun. 6, 1995

Related U.S. Application Data

[62] Division of Ser. No. 219,140, Mar. 29, 1994, abandoned.

[51] Int. Cl.$^6$ ..................................................... G06K 9/66
[52] U.S. Cl. ........................................... 382/125; 382/157
[58] Field of Search ................................. 382/124, 125, 382/156, 157; 395/23

[56] References Cited

U.S. PATENT DOCUMENTS

| 4,151,512 | 4/1979 | Riganati et al. | 382/5 |
|---|---|---|---|
| 4,156,230 | 5/1979 | Riganati et al. | 382/125 |
| 5,272,657 | 12/1993 | Basehore et al. | 395/27 |
| 5,337,369 | 8/1994 | Shibuya | 382/5 |

OTHER PUBLICATIONS

Gonzalez et al. *Digital Image Processing*. Addison–Wesley Publishing Co. 1992, pp. 605–619.

McMichael. "Structural Generalization in Neural Classification: Incorporation of Prior Probabilities". IEE Colloq. Adaptive Filter, Non–Linear Dynamics and Neural Networks: Nov. 1991, pp. 611–615.

Fakhr et al. "Probability of Error, Maximum Mutual Information, and Size Minimization of Neural Networks". IJCNN International Joint Conf. on Neural Networks. Jun. 1992, vol. 1, pp. 901–906.

C. Crawford, "Automated Fingerprint Identification: An Independent Study", Oct., 1991, pp. 1–37.

R. E. Gaensslen, "Advances in Fingerprint Technology", Published: Elsevier Co, Inc. NY, 1991, pp. 176–182.

L. Zadeh, "Syllosgistic Reasoning in Fuzzy Logic and its Applicaiton to Usuality and Reasoning with Dispositions", IEEE Transactions on Systems, Man & Cybernetics, vol. SMC–15, No. 6, Nov./Dec. 1985 pp. 754–762.

P. Wasserman, "Artificial Neural Network Automatic Fingerprint Classification", Presentation given at Research in Criminal Justice Information Services Technology Symposium, Sep. 9–10, 1993, Gaithersburg, MD., 1 page.

J. Kagel et al., "Automatic Fingerprint Classifier Using An Entropy Net", Presentation given at Research in Criminal Justice Information Services Technology Symposium, Sep. 9–10, 1993, Gaithersburg, MD., 1 page.

J. Bowen, "Automatic Fingerprint Pattern Classification Using Neural Networks:", Presentation given at Research in Criminal Justice Information Services Technology Symposium, Sep. 9–10, 1993, Gaithersburg, MD, 1 page.

(List continued on next page.)

*Primary Examiner*—Leo Boudreau
*Assistant Examiner*—Jon Chang
*Attorney, Agent, or Firm*—Perman & Green

[57] ABSTRACT

A technique for fingerprint classification and/or identification, in which a fingerprint is defined by areas containing patterns of ridges and valleys. At least one local pattern is determined using locations and characterizations of the fingerprint, which are indicated by a rapid change in direction of the ridges and valleys. The fingerprint is classified into types based upon the relative locations and characterizations of said local pattern(s). The fingerprint identification process can utilize minutiae location and angles as well as local pattern characterizations. Neural networks are utilized in determining the local patterns. The amount of data required to store data defining the fingerprints using the local pattern and/or minutiae techniques is significantly reduced.

4 Claims, 8 Drawing Sheets

OTHER PUBLICATIONS

G. Candela, et al., "Comparative Performance of Classification Methods for Fingerprints", Presentation given at Research in Criminal Justice Information Services Technology Symposium, Sep. 9–10, 1993, Gaithersburg, MD, 1 page.

Kanaya et al. "Bayes Statistical Behavior and Valid Generalization of Pattern Classifying Neural Networks", IEEE Tran. Neural Net., vol. 2, No. 4, pp. 471–475, Jul. 1991.

Leung et al., "Fingerprint Recognition Using Neural Network", Neural Networks For Signal Processing Workshop, pp. 226–235, Sep. 1991.

Kononenko, "Feedforward Bayesian Neural Network and Continuous Attributes", IEEE Joint Conf. Neural Networks, vol. 1, pp. 146–151, Nov. 1991.

Moscinska et al., "Neural Network Based Fingerprint Classification", Third Int. Conf. Art Neural Net. pp. 229–232, May, 1993.

WHORL FINGERPRINT TYPE
FIG. 1a

LEFT LOOP FINGERPRINT TYPE
FIG. 1b

RIGHT LOOP FINGERPRINT TYPE
FIG. 1c

TENTED ARCH FINGERPRINT TYPE
FIG. 1d

ARCH FINGERPRINT TYPE
FIG. 1e

WHORL LOCAL
PATTERN

FIG. 7a

DELTA LOCAL
PATTERN

FIG. 7b

CONCAVE/UP
LOCAL PATTERN

FIG. 7c

CONCAVE/DOWN
LOCAL PATTERN

FIG. 7d

CORE/RIGHT
LOCAL PATTERN

FIG. 7e

CORE/LEFT
LOCAL PATTERN

FIG. 7f

ARCH LOCAL
PATTERN

FIG. 7g

TENTED ARCH
LOCAL PATTERN

FINGERPRINT CLASSIFICATION SYSTEM

This is a divisional of application Ser. No. 08/219,140 filed on Mar. 29, 1994, now abandoned.

FIELD OF INVENTION

The present invention relates to a system capable of classifying fingerprints into different types. More specifically, it relates to a learning computer program which examines fingerprints for the detection of local pattern forms in regions of interest. Following a rule based program, fingerprints can then be classified into types and/or identified based upon these local pattern forms and locations.

BACKGROUND OF THE INVENTION

The use of fingerprinting is well known for identifying individuals as well as a tool in criminal investigations. Fingerprints are particular to the individual, but may be classified into major types based upon their pattern (right loop, left loop, whirl, arch, tented arch, etc.). Each type has its own distinguishing characteristics, even though every fingerprint within a given type is distinct. All people have one of these fingerprint types.

Two fingerprints taken from the same finger of the same individual a matter of seconds apart will vary considerably. This results from the fact that different amounts of ink may be applied to the finger, and that the finger rolls and finger impressions will never quite be identical. The challenges associated with classifying particular types of fingerprints and/or identifying fingerprints become evident when both their many potential patterns and difficulties in obtaining indicative samples are taken into consideration.

Largely based upon the complexity of automating the classification of fingerprint types and identification of fingerprints, the FBI and the local police agencies still primarily use manual methods. The manual methods are notoriously slow, boring, and not always reliable. This is a task which begs for automation.

Prior attempts to automate the classification and/or identification of fingerprints have generally concentrated upon considering the characteristics of the entire fingerprint. The major problem with this approach is that fingerprints are so complex that extremely large amounts of computer storage space are required to classify fingerprints by types. This tends to slow down the identification process, and make the automated process less efficient.

In general, large areas of each fingerprint do not contain any information that is useful for fingerprint type classification and identification. Fingerprints, in fact, are more readily classified by the local patterns in locations where the direction of the ridges and valleys change rapidly (as, for example, whorl local pattern locations and delta local pattern locations). Therefore, in classifying fingerprints according to type, it would be very useful to determine the relative positions of the fingerprint where the ridges change directions rapidly (also known as local pattern locations), and the pattern form which is characterized at each local pattern location.

Another characteristic of prior attempts to automate the classification of fingerprinting is that they involve systems which have a very slow learning process. Addition of learning processes proved extremely useful over non-learning techniques since the use of learning process programs provide for more accurate fingerprint classification (after the fingerprint classification system has been run for some period.) Typically, the quicker the computer program can "learn" to properly identify fingerprint types, the more useful the system.

The present invention provides a system which provides for very rapid learning, since only relatively small portions of the fingerprint are used (local patterns). It is generally much simpler to provide an accurate, rapid learning, program which is based on a relatively small, easily detectable amounts of data than large amounts of data, much of which is often irrelevant for fingerprint classification.

It would therefore be highly desirable to have a system where all local pattern locations, and the form of the local patterns, could be identified quickly. In this manner, each fingerprint could be readily classified using a rule based computer program that operates on the local pattern information. This technique of fingerprint classification would consume a minimal amount of memory relative to the prior art approach of storing the entire fingerprint image. It would also be desirable to employ a rapid learning algorithm with this computer program, such that it would become more effective as more fingerprints are encountered. The learning algorithm is based upon such neural networks (using Bayesian or fuzzy logic) and expert systems. The computer program would be robust in nature, would be model based, and would have a demonstrated capability of handling and quickly learning by using data (such as fingerprint data) which is statistical in nature.

SUMMARY OF THE INVENTION

The present invention relates to a technique for fingerprint classification, in which the fingerprints are defined by areas containing patterns of ridges and valleys. At least one local pattern is determined using locations and characterizations of the fingerprints, which are indicated by a rapid change in direction of the ridges and valleys. The fingerprints are classified into types based upon the relative locations and characterizations of said local pattern(s). In a similar manner, the present invention also relates to a technique for fingerprint identification, in which the same local patterns are used in combination with ranked minutiae of the fingerprint patterns to automatically obtain a specific identification of a fingerprint. It is envisioned through this disclosure that either Bayesian logic or Fuzzy logic may be applied.

DETAILED DESCRIPTION OF THE PRESENT INVENTION

In this disclosure, the particular grid patterns used by the detectors, and the computer programs, are intended to be illustrative in nature, and not limiting in scope. The term "fingerprint type" refers to the overall ridge and/or valley pattern of an entire fingerprint. The term "local pattern" or "local pattern form" refers to the ridge and/or valley configuration over a relatively small portion of a fingerprint.

Fingerprint Classification

In order to automatically classify fingerprints into various types (which include whorl, left loop, right loop, arch, and tented arch), a digital data format is highly advantageous and quite applicable, already having been applied to such areas as pattern recognition, neural networks and expert systems. The fingerprint typing system can be organized to follow the basic principles utilized in digital picture processing.

Figure 1A:
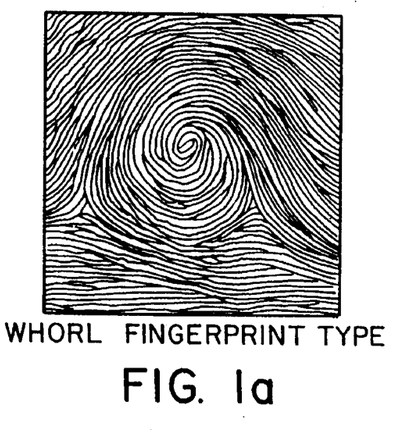
FIG. 1a illustrates a typical "whorl" type fingerprint.
Figure 1B:
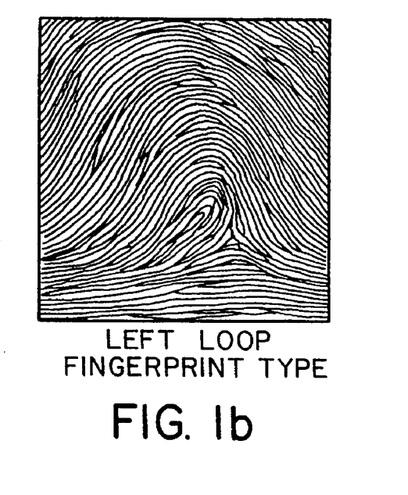
FIG. 1b illustrates a typical "left-loop" type fingerprint.
Figure 1C:
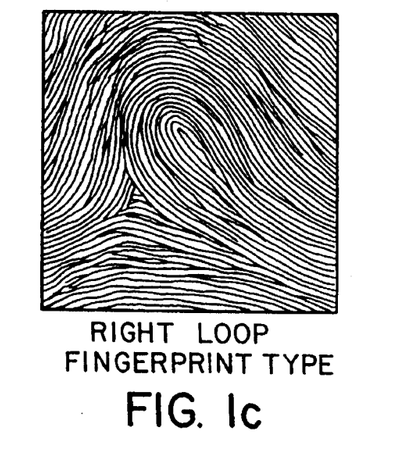
FIG. 1c illustrates a typical "right-loop" type fingerprint.
Figure 1D:
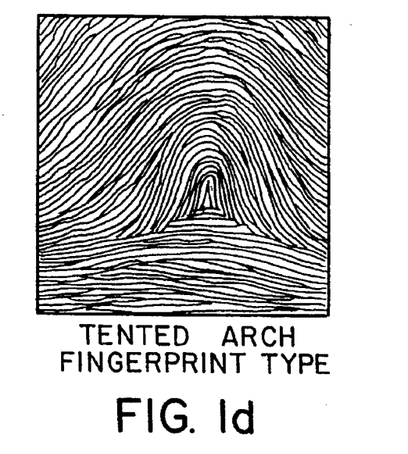
FIG. 1d illustrates a typical "tented arch" type fingerprint.
Figure 1E:
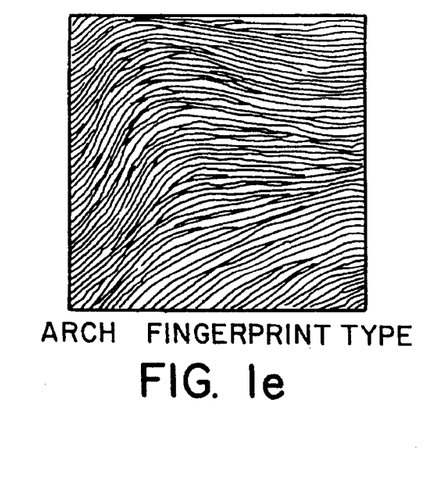
FIG. 1e illustrates a typical "arch" type fingerprint.

The basic types of fingerprint patterns are illustrated in FIGS. 1*a*–1*e*. FIG. 1*a* illustrates the basic outline of a whorl fingerprint. FIGS. 1*b* and 1*c* illustrate the basic outline of a left loop and right loop fingerprint type, respectively. FIG. 1*d* is a tented arch type fingerprint. An arch type fingerprint is illustrated in FIG. 1*e*, which is identical to the tented arch type fingerprint except there is no delta local pattern located below the arch. There are no other fingerprint types.

Figure 2:
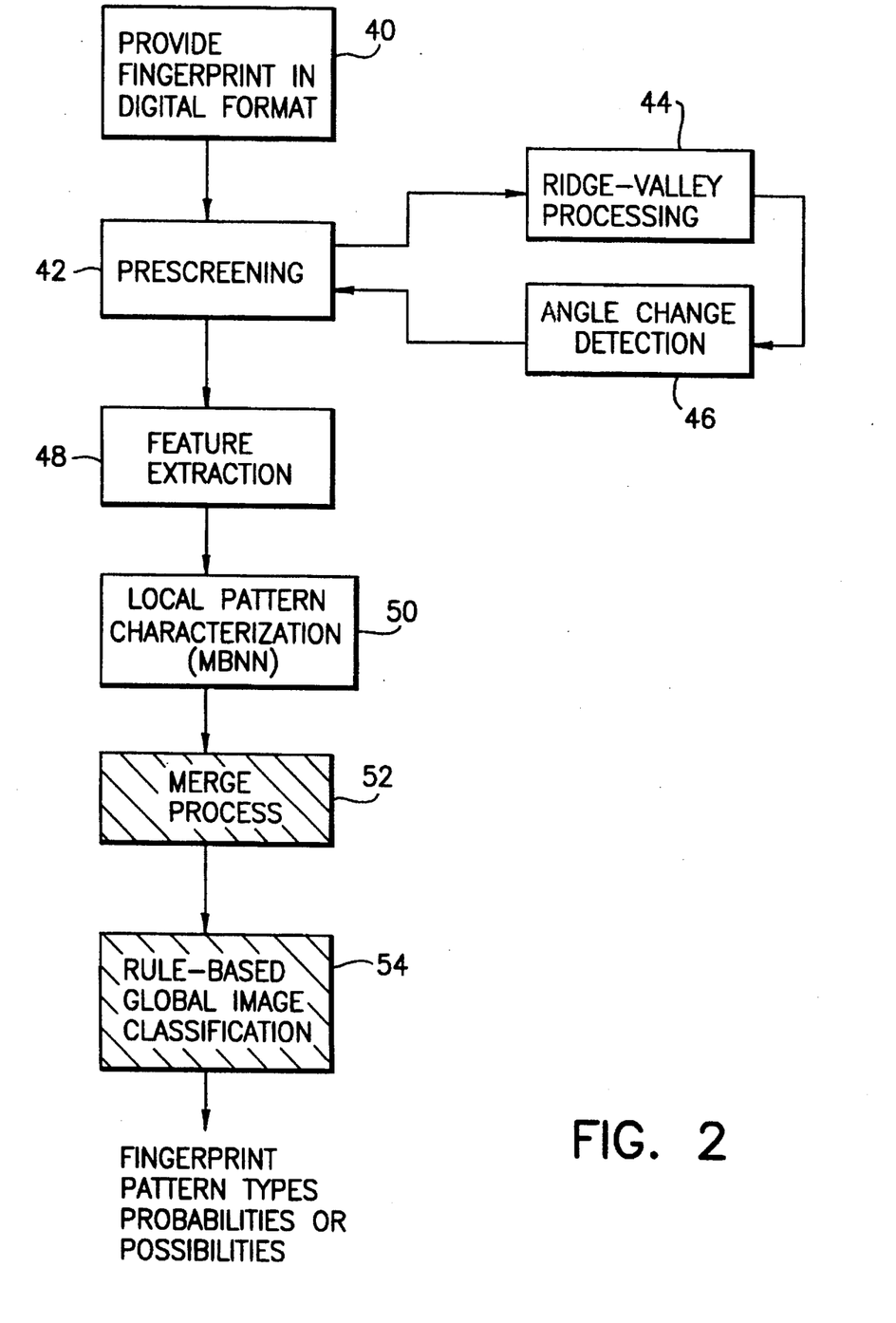
FIG. 2 illustrates a flow chart of one embodiment of the fingerprint classification system of the present invention.

FIG. 2 illustrates the steps outlined in the automatic classification process of the present invention. The steps include a "provide the fingerprint to be classified in a digital format" step 40; a "prescreening" step 42 which comprises a ridge valley processing portion 44 and an angle change detection portion 46; a "feature extraction" step 48; a "local pattern characterization" step 50; a "merge process" step 52; and a "rule-based global image classification" step 54. This process is one embodiment of the basic outline of the present invention. Not all of the above steps are necessary for the present invention. Also, other steps can be added in the FIG. 2 embodiment while remaining within the scope of the present invention.

In order to accomplish the above steps, a relatively sophisticated general purpose digital computer should be used. Each of these steps will now be outlined in order.

"Provide Fingerprint in Digital Format" Step 40

The first step is to "provide the fingerprint to be classified in a proper digital format" step 40, which converts the inked fingerprint pattern (on a paper card) into a digitized format by using a scanner interfaced with a digital computer. The scanner has, for example, a 512×512 pixel array. It has been found that an 8-bit gray scale is adequate to obtain the necessary resolution for the further processing.

Another technique which may be used in this step is to impress the fingers against transparent glass, at which time the fingerprint itself is scanned directly into the digital computer. Both of these techniques are known in the prior art, and by themselves do not form a basis for the present invention.

"Prescreening" Step 42

The next step is the "prescreening" step 42 which includes a ridge valley processing portion 44 and an angle change detection portion 46. The overall function of the "prescreening step" 42 is to determine where there are rapid changes in the directions of the ridges and/or valleys within the fingerprint. The relative locations where the ridge and/or valley direction changes significantly (and the patterns indicated by the direction change) are called "regions of interest", and in this disclosure provide vital information useful for typing fingerprints.

It is desirable that the prescreening step reduce the amount of data which is processed for each fingerprint, during the fingerprint classification process, into only that data which provides useful identifying information. This reduction not only increases the identification speed, but also minimizes the data storage involved with classifying a large number of fingerprints, and permits a rapid application of a learning system described herein (which is one of the desired objects of the present invention.)

Ridge and/or Valley Processing Portion 44

Figure 3:
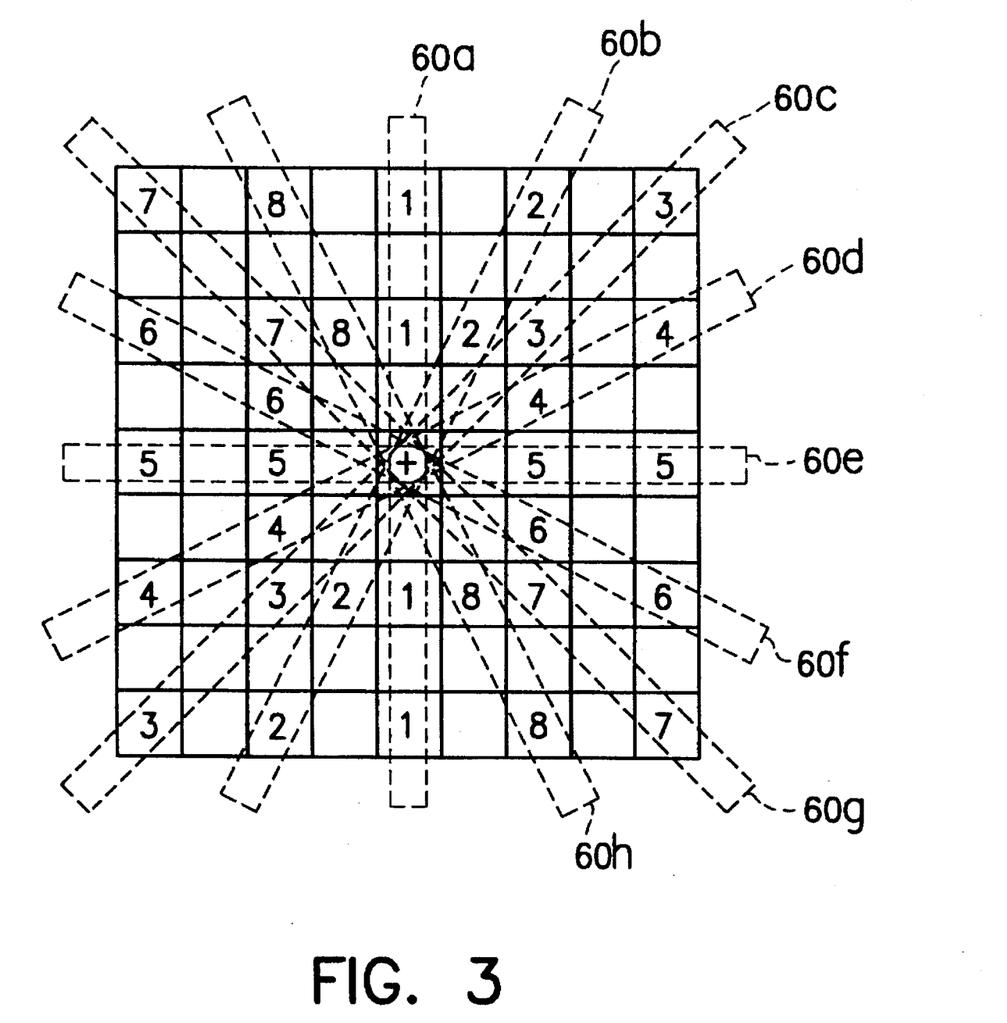
FIG. 3 illustrates one embodiment of a plurality of window slots (60a–h) which is used in the prescreening portion (42) of FIG. 2.

The ridge and/or valley processing portion 44 first determines the ridge and/or valley direction at each pixel location (typically a 512×512 pixel array is used) using a 9×9 pixel window around each considered pixel. The 9×9 pixel window contains eight slits 60*a*, 60*b*, 60*c*, 60*d*, 60*e*, 60*f*, 60*g*, 60*h* which represent each of eight quantized directions as illustrated in FIG. 3. The quantized ridge direction corresponds to the particular slit 60*a* to 60*h* which is most nearly parallel to the direction of the pattern of the ridge and/or valley. The slits 60*a* to 60*h* are oriented to cover an angle of 180 degrees (the quantized orientation in the remaining 180 degrees can be determined by subtracting 180 degrees from the value).

The technique by which the 'ridge' window most particularly matches one of the eight quantized slits 60*a* to 60*h* is by the method used by NIST [Wilson et al., "Massively Parallel Neural Network Fingerprint Classification System in NISTIR 4880", National Institute of Standards and Technology, Gaithersburg, Md., July 1992 pp 21–22 (Incorporated Herein by Reference).

Each pixel location is also characterized by an amplitude or confidence measure. The amplitude of 1.0 is assigned to all of the pixels at the ridge valley processing portion 44. The pixel locations are then summed using vectors over a 16×16 pixel array centered at the applicable point to calculate the resultant angle and amplitude for that pixel. In so doing, the primary direction measurements are smoothed out with a fine quantization. The techniques involves in determining orientations of general shapes of digital images are described in most texts in digital image processing.

The output of this process is a grid array of angles and amplitudes which best describe the ridge and valley pattern for each grid, where each grid contains a 16×16 pixel array. The angle (between 0 and 180 degrees) of the slit 60a to 60h which best corresponds to the direction of the ridge or valley is selected as the orientation of the ridge or valley. The amplitude represents the confidence of the angle measurement, i.e. a smaller amplitude can either result from a noisy image area or a large variation in direction measurements within each 16×16 pixel grid.

Angle Change Detection Processing Portion 46

The angle change detection processing portion 46 represents the second portion of the "prescreening" step 42. Significant locations (those which may be most easily utilized to classify fingerprints) coincide with areas of sudden changes in the ridge angles. The angle change detection processing portion 46 detects and selects those locations within the surveyed grid area of the ridge valley processing portion 44 where the angle measurements change significantly. To accomplish this, the digital computer compares the angles between adjacent grid locations. To avoid spurious comparisons arising from the uncertain angles (those with small amplitudes), a vectorial sum of 4 grid points adjacent to each grid location is used to determine the angle change occurring at that grid location. Only at those locations with angle difference greater than 25 degrees, with average amplitudes measured for both compared angles greater than 0.2, are selected as regions of interest.

The particular dimensions will vary if the pixel locations, or certain other factors, are altered. Therefore, the particular values used in this disclosure are illustrative in nature, and are not intended to be limiting in nature.

The output of the angle change detection processing portion 46 (and the prescreening step 42) is a map (angle and amplitude measurements for all grid locations), and a list of non-spurious locations where a large change in the vector directions occur. Further processing steps are performed at only the non-spurious, large angle change (cues) locations. The prescreening step reduces further computer processing time to only those activities involved with precisely classifying the fingerprint types.

"Feature Extraction" Step 48

The "feature extraction" step 48 provides a more efficient grid size for the digital computer to analyze the local patterns of the fingerprints. A sample of a 7×7 grid point array (using the directional and amplitude values derived from the center grid of the 7×7 grid point array), is illustrated in Table 1, and uses large angle changes received as cues from the angle change detection portion 46 based upon the previously mentioned 16×16 pixel array within each grid. The sub-array is centered at the location selected by the prescreening process (illustrated by the encircled plus sign). Feature measurements are made from the eight zones of the sub-array using the FIG. 3 direction configuration.

TABLE 1

| SAMPLE ZONE DEF. OF FEATURE EXTRACTION | | | | | | |
|---|---|---|---|---|---|---|
| 6 | 6 | 5 | 5 | 5 | 4 | 4 |
| 6 | 6 | 5 | 5 | 4 | 4 | 4 |
| 7 | 6 | 6 | 5 | 4 | 3 | 3 |
| 7 | 7 | 7 | ⊕ | 3 | 3 | 3 |
| 7 | 7 | 8 | 1 | 2 | 2 | 3 |

TABLE 1-continued

| SAMPLE ZONE DEF. OF FEATURE EXTRACTION | | | | | | |
|---|---|---|---|---|---|---|
| 8 | 8 | 8 | 1 | 1 | 2 | 2 |
| 8 | 8 | 1 | 1 | 1 | 2 | 2 |

For each zone, the average angle and amplitude are calculated. Therefore, a total of 16 features are measured (angle and amplitude for each of the eight zones). Processing the 16 features simultaneously provides a satisfactory characterization for each of the local pattern characterizations possible (whorl, delta, concave up/down, core right/left, as described below).

"Local Pattern Classification" Step 50

Figure 7A:
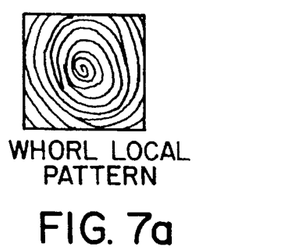
FIG. 7*a* illustrates a typical "whorl" local pattern.
Figure 7B:
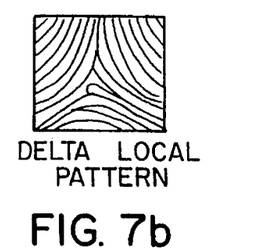
FIG. 7*b* illustrates a typical "delta" local pattern.
Figure 7C:
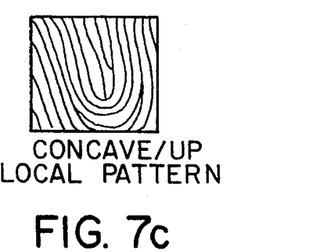
FIG. 7*c* illustrates a typical "concave/up" local pattern.
Figure 7D:
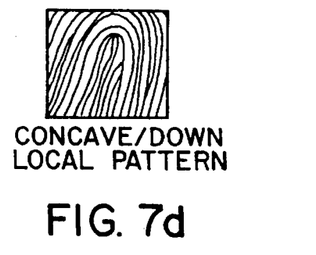
FIG. 7*d* illustrates a typical "concave/down" local pattern.
Figure 7E:
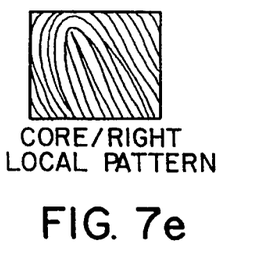
FIG. 7*e* illustrates a typical "core/right" local pattern.
Figure 7F:
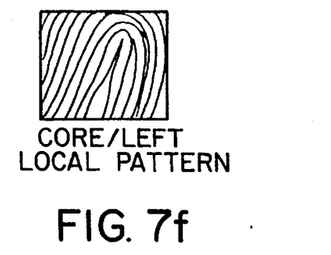
FIG. 7*f* illustrates a typical "core/left" local pattern.
Figure 7G:
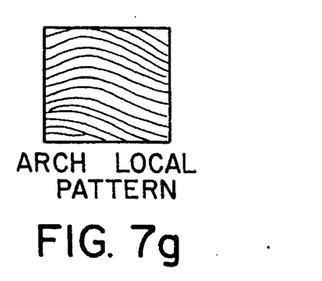
FIG. 7*g* illustrates a typical "arch" local pattern.
Figure 7H:
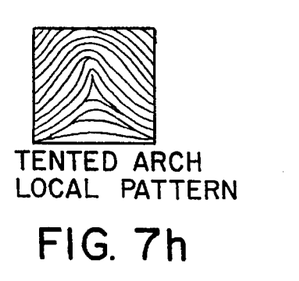
FIG. 7*h* illustrates a typical "tented arch" local pattern.

The function of the "local pattern characterization" step 50 is to consider the data derived in the "feature extraction" step 48 for each local area, and then determine which pattern type this most closely resembles. The common local pattern forms, which are illustrated in FIGS. 7a–7h include whorls (FIG. 7a), deltas (FIG. 7b), concave up (FIG. 7c) (concave down (FIG. 7d)), core right (FIG. 7e), and (core left (FIG. 7f)), arch (FIG. 7g), and tented arch (FIG. 7h).

The local pattern forms illustrated in FIGS. 7a–7h represent some, but not all of the local pattern forms which may exist. Some of the names of the local pattern forms of FIGS. 7a–7h are similar to the fingerprint types illustrated in FIGS. 1a–1e; it is important to maintain a distinction between local pattern forms which describe pattern direction change in a small region of fingerprint, and fingerprint types which describe the general pattern of the entire fingerprint. The user of the program must initially input examples of the local pattern forms with the proper characterization for each local pattern. After which the program (during the local pattern characterization step 50) "learns" the different local pattern characterization utilizing the model-based techniques described later in the specification. In this manner, the local pattern forms are characterized using a mathematical model, and not a rule based technique. Using a mathematical model is preferable in characterizing local pattern forms since formulating concrete distinctions between certain local patterns can be very difficult to positively distinguish. Other types of local pattern forms may exist which are not illustrated in FIGS. 7a–7h (these Figs. are intended to be illustrative in nature and not limiting in scope.)

It is useful that the computer program could improve on, or "learn" about, the different fingerprint classifications as it processes more fingerprints. In this manner, it would become more reliable as its data stores increase.

A distinct type of local pattern form which may be derived during the local pattern characterization step 50 is a "background" pattern. The background pattern exists when some variety in the direction of the ridges and/or valleys exist which may be formed by noise, some other disturbance, or alternatively the local pattern is not learned at this time. The background local pattern may be used in determining certain types of fingerprints, as illustrated in Table 1.

Characterizing local pattern forms preferably utilize digital computer programs which are based on neural networks (either utilizing Bayesian logic or fuzzy logic), expert systems, or preferably some other technique which provides results that improve upon the use of a priori data (learning process). For the purpose of this disclosure of the "local pattern classification" step, an existing Bayesian neural network system is used. However it should be emphasized that any of the above systems could be used with modifications as would be within the knowledge of those skilled in the art. Fuzzy logic utilizes possibilistic rules in place of the Bayesian probabilistic rules as described below.

One aspect of the program selected for the "local pattern classification" step 50 is that fingerprint pattern recognition programs need only be concerned with the pattern of the fingerprint, and not the brightness of certain sections. This differs from other pattern recognition programs in which the brightness of certain portions play a significant role in the pattern recognition process (such as determining target location for weapons, missiles, aircraft, etc.). It has been found that certain pattern recognition programs that are suited for target location are also applicable to fingerprinting applications. For example, model based neural network programs (hereafter referred to as "MBNN") has been found to have a 97% accuracy in fingerprint classification.

A more complete description of one embodiment of software which may be utilized in this step, as well as an application of one particular Bayesian neural network program, is illustrated later in this disclosure.

"Merge Process" Step 52

Similar cues of similar local patterns in the same local area are preferably merged into one cue as a means of eliminating redundant cues. This is done in the "merge process" step 52. The application of this step can vary considerably. However, if two or more cues of the same type exist within a 80 pixel distance, then it is advisable to merge those cues into a single cue. The "merge process" step 52 is not absolutely necessary but, if not included, then the rules of the "global image classification" 54 step must be modified accordingly.

"Global Image Classification" Step 54

The pattern classification of fingerprint images in this step is based upon spatial arrangements of various pattern types. An example of decision rules that may be used in this process are illustrated in Table 2. This classification scheme is rule based. The output of the global image classification step 54 is the classification of a fingerprint into a specific type. Table 3 illustrates the success rate of this step as applied by the techniques described in the present invention, which compare very favorably to prior art fingerprint classification techniques which do not utilize a local pattern characterization step.

Since the local pattern characterization step provides results which have either possibilistic or probabilistic values for multiple local pattern characterizations, it is also likely that the global image classification step 54 may provide several possible fingerprint types. Depending upon the specific application of fingerprint classification, only fingerprints with local pattern characterization values above a pre-determined threshold may be used in one embodiment. Alternately, only if the possibilistic or probabilistic values of one local pattern is much higher than another local pattern, will the global image classification step be applied. The above provide examples and are not intended to be limiting in scope.

TABLE 2

Fingerprint Type Classification

| Basic Type | Subordinate Type | Rules (based on local patterns) |
|---|---|---|
| Whorl | Central Pocket Loop | At least one delta local pattern exists, and one whorl local pattern exists. If two delta local patterns exist, one of them is very close to a whorl-like local pattern. |
|  | Plain Whorl | Two delta exist, and both concave-up and concave-down local patterns exist. The two concave-up, concave-down local patterns are between the two delta-local patterns. A whorl-like local pattern also exists between two delta local patterns (from left to right) and between concave-down and concave-up local patterns (from top to bottom) patterns. |
|  | Double Loop | The same as plain-whorl except the whorl-like local pattern is missing and the concave-down and concave-up are less lined up in the vertical direction. |
|  | Accidental | More than two or more delta local patterns. More than one local pattern in the pattern area. |
| Loop | Right Loop | One delta and one core/right (or concave-down) local pattern exists. The core/right (or concave-down) local pattern is at the right-hand side of the delta local pattern. |
|  | Left Loop | One delta and one core/left (or concave-down) local pattern exists. The core/left (or concave-down) local pattern is at the left-hand side of the delta local pattern. |
| Arch | Plain Arch | No delta local pattern detected, arch local pattern detected. |
|  | Tented Arch | Concave-down local pattern is directly above the delta local pattern. only one delta local pattern is detected, tented arch local pattern detected. |
| Rejection | N/A | There is no definite classification for whorl-like, core/left, core/right . . . etc. local patterns. Cue locations are in a noisy area. |

Implementation of the Local Pattern Classification Step

The following sub-sections a through e lists and describes software programs which may be utilized in the "Local Pattern Characterization" step 50, and what some potential advantages and disadvantages of each may be.

a. Artificial Intelligence/Expert System Detection Algorithms

Artificial Intelligence/Expert System (AI/ES) algorithms would classify fingerprints through a sequence of rule-based decisions, or inferences operating on a particular knowledge bases. These processes have the advantage of incorporating a broader decision processes than utilized by a human being expert. The potential disadvantages in applying the programs to fingerprint type classification are: (a) expert interpreters who can define successful rules or a working knowledge base are not readily available; (b) humans are good in integrating image contexts, but not in using the multidimensional data that would be needed for such algorithms; (c) AI/ES algorithms are not feasible for applications that require frequent updating for new fingerprints; and (d) this approach is not feasible for real-time fingerprint classification on massive amounts of multidimensional search mode data. This approach therefore has not been used for the basic detection task of large scale fingerprint classification programs.

b. Statistical Detection Algorithms

This process uses Bayesian logic for characterization of local pattern forms of fingerprints.

The feature vector of D different features from the digitalized fingerprint signal is defined as $$\underline{f}=(f_1,f_2,\ldots,f_D)$$

and, $\underline{O}=(O_1,O_2,\ldots,O_K)$ is defined as the vector of K object types which occur in the fingerprint. Also, $O_K$ is defined as the class of all other signals not specifically identified, so the vector $\underline{O}$ spans the set of all objects. From statistical decision theory, the Bayesian Minimum Error Decision Function is defined by:

$O_k'$=Bayesian Minimum Error Decision

If $P_r(O_k'/\underline{f})$=maximum of $\{P_r(O_k/\underline{f})\}$ for all k, (1)

or the class $O_k'$ is chosen which maximizes the a posteriori probability $P_r(O_k/f)$.

From Bayes Rule, the a posteriori probability in equation (1) can be obtained from $$P_r(O_k/\underline{f}) = \frac{p(\underline{f}/O_k)P_r(O_k)}{\sum_{l=1}^{K} p(\underline{f}/O_l)P_r(O_l)} \quad (2)$$

where $p(\underline{f}/O_k)$ is the conditional density function (df) of $\underline{f}$ for object $O_k$, and $P_r(O_k)$ is the a priori probability of object $O_k$. The a priori probabilities are known (or easily approximated), and the $p(\underline{f}/O_k)$ must then be estimated (not an easy task) to obtain the minimum error decision, which is highly desirable in fingerprint classification for producing accurate results.

Statistical detection theory shows the minimum error cue ranking to consist of the a posteriori probability as in equation (2). The advantages of this approach are the theoretical basis, and the complete use of background densities to help determine the probability of characterizing features in the fingerprint. The disadvantages of statistical detectors are their large dynamic range for the density functions, the difficulties in estimating reliable a posteriori density functions (especially for multiple dimensions), and their lack of robustness when confronted with an input not typical of the training distributions.

C. Neural Network Detection Algorithms

The following section briefly explains the basic concepts of neural networks (NNs), which may be used to further enhance the learning process in the local pattern characterization step. The most basic single node element of a NN sums the product of interconnect weights $w_1, w_2, \ldots, w_D$ times the corresponding inputs $x_1, x_2, \ldots x_D$; then it subtracts a threshold u, and applies a nonlinear function F to the result to give an output y, where:

$$y = F\left(\sum_{i=1}^{D} w_i x_i - u\right) \quad (3)$$

Feedback learning for the neural element consists of modifying the weights and the threshold, based on the error, defined as the difference between the output y and desired output y*. An example of basic Perceptron learning is given by:

$$w_i(t+1)=w_i(t)+h\ [y^*(t)-y(t)]x_i(t) \quad (4)$$

where $w_i(t+1)$ is the new weight at time increment t+1, and h is a learning rate gain term (between 0 and 1) which controls the rate of learning, or relative influence of the error. These changes in the weights move the discriminant boundary to new locations as depicted by alternate results in two-dimensional space by lines 2, 3, 4, and 5 in FIG. 4a.

Figure 4A:
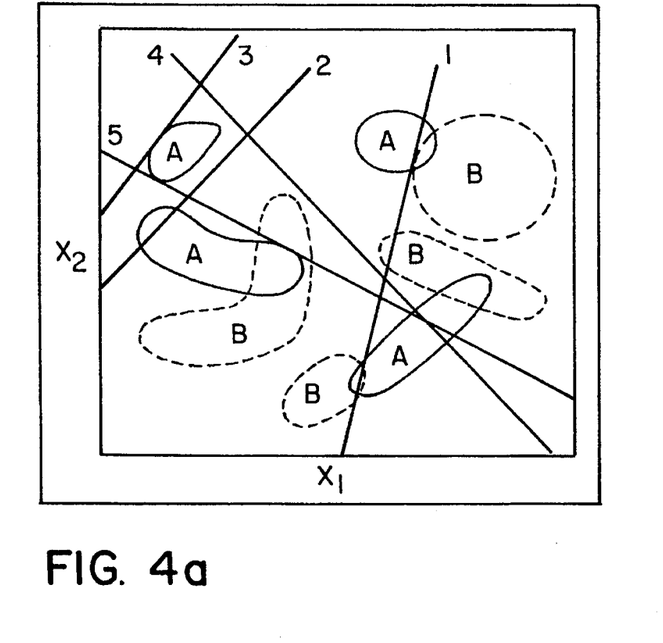
FIG. 4a illustrates a plot of an example of a discriminating Class A and B with combinations of linear discriminant functions in two dimensional space.
Figure 4B:
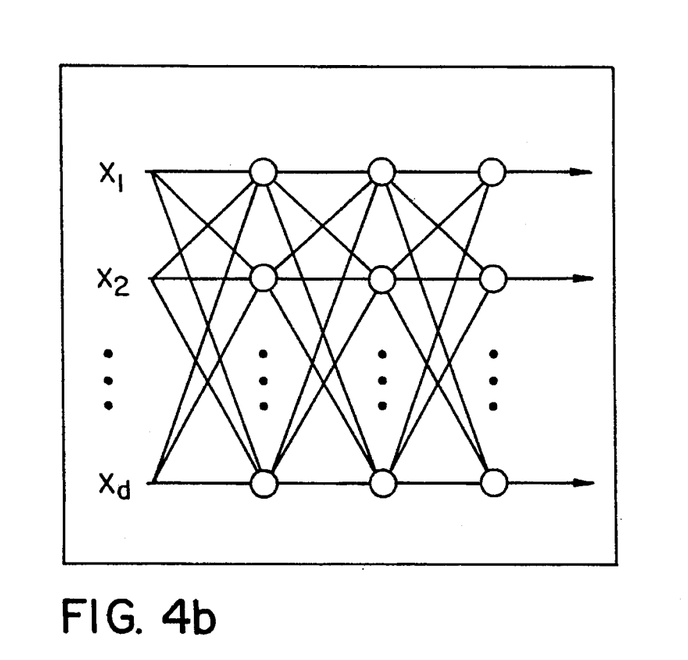
FIG. 4b illustrates a generated three layer neural network.

The simple linear discriminant function of the basic neural element is adequate for a simple local pattern characterization problem involving only single unimodal distributions for A and B, like the two subsets shown separated by line 1 in the upper right corner of FIG. 4a. However, for general complex multimodal distributions as exemplified by the combination of all subsets for A and B in FIG. 4a, a much more powerful discriminant function is needed. This is accomplished by combining and interconnecting many neural elements into a multilayered NN, as illustrated in the three-layer NN of FIG. 4b. It can be shown that three layers are adequate to define any arbitrarily complex decision function for separating any general multimodal distribution.

Two important processes for defining the NN structure are Kohenen's algorithm for self-organizing feature maps, and the back-propagation training algorithm for feedback learning with multilayered networks. As can be seen for multimodal distributions in FIG. 4a, a classification error between two sub-distributions of A and B should require changes in some weights and not in others (particularly, not those related to separating other unrelated sub-distributions of A and B). Thus, for very complex multimodal distributions in high-dimensional space, the learning will often not converge at all, or may converge to a network with uncertain and low performance. The fact that the prescreening step 42 reduces the amount of data utilized makes the convergence process much simpler.

The advantages of NNs are: (a) they are powerful discriminant functions because they define general multimodal discriminants; (b) they are robust classifiers because of the nonlinear (saturating) functions with the combining of many separate interconnecting inputs to make a final decision; (c) they have a built-in learning structure; and (d) they are well suited for special real-time implementation. The difficulties in using NNs are: (a) uncertain choice of network configuration; (b) randomness in choice of initial weight values; (c) unreliable learning convergence with multimodal distributions; and (d) lack of relationship to underlying physical principles.

d. Characterization Process Using Model Based Neural Networks—(MBNN)

This is the approach which is presently preferred for implementing the "Local Pattern Characterization" step 50 of FIG. 2.

Figure 5:
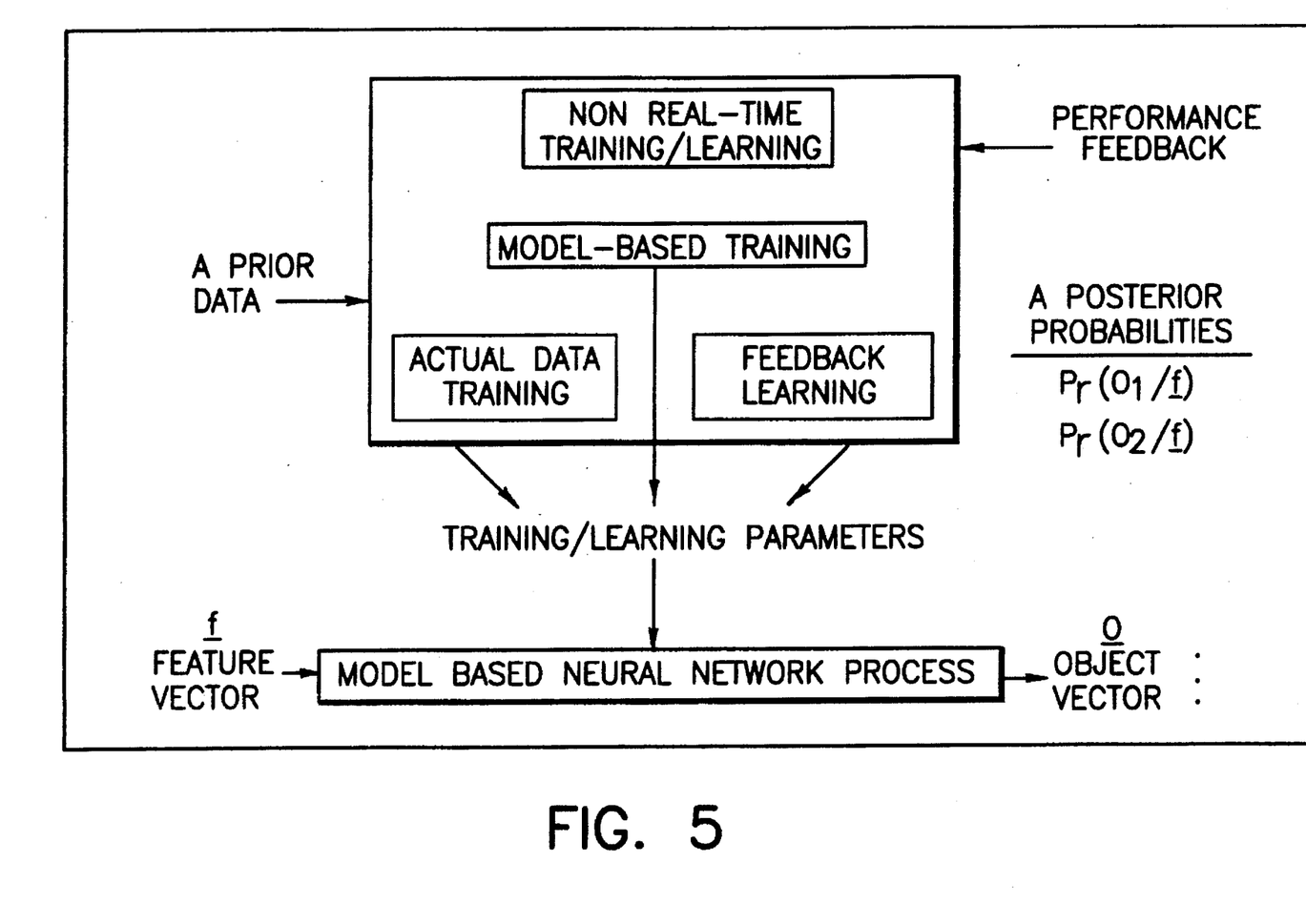
FIG. 5 illustrates one embodiment of a flow chart of a model based neural network (MPNN) program as applied to fingerprint classification in the present invention.

The object detection process makes the MBNN as depicted in FIG. 5. The purpose of this process is to accept any multidimensional feature vector information and output an estimate of the a posteriori probability for any local pattern characterization. This approach already approximates the theoretical best performance for fingerprint characterization. Only the loaded training parameters are changed in the MBNN to handle any of the local pattern form characterizations for fingerprinting.

The MBNN described as follows is based on an innovative hybrid method for estimating the a posteriori probabilities in a manner that captures the advantages of Bayesian statistical detection, and neural network detection. This circumvents the disadvantages present in each of these individual approaches.

One objective is to estimate $P_r(O_k/f)$. The problem is to define the estimate such that it (a) is reliable and practical for complex multidimensional feature space, (b) accurately handles the impact on local pattern characterization from correlated features, (c) avoids dynamic range problems of statistical classifiers, (d) includes neural network saturation for robustness, (e) is a parametric form where the training/learning parameters have a physical basis, and (f) has parameters with localized feature space impact for simple and reliably convergent learning. A brief description of the estimation process follows:

The desired cue ranking output is:

$$P_r(O_k/f) = \frac{p(f/O_k)P_r(O_k)}{\sum_{l=1}^{K} p(f/O_l)P_r(O_l)} \qquad (5)$$

Figure 6:
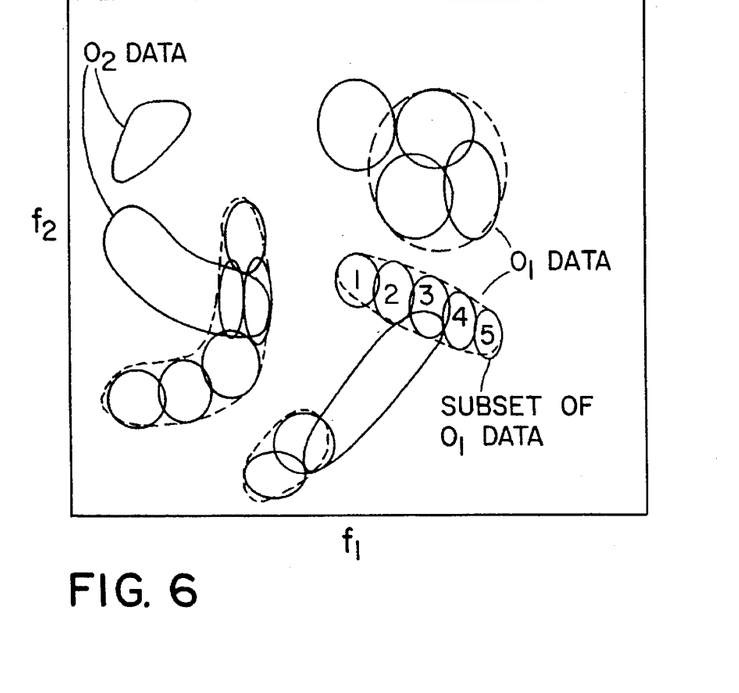
FIG. 6 illustrates one embodiment of the complex density functions, which with fingerprint classification produce clustering, as may be the case in the present invention.

The a priori probabilities $P_r(O_k)$ for each object is known (or easily estimated), so the conditional densities $p(f/O_k)$ need to be estimated. An example of a scatter plot (histogram) of training data for objects 1 and 2 in two-dimensional feature space is illustrated in FIG. 6. The cross-hatched and not cross-hatched regions are multimodal and irregularly shaped (correlated). It is difficult to define a general form for $p(f/O_k)$ for such density functions. Therefore, clustering is first utilized to break up each object training set into a superposition of simpler subdensity functions, where $p_j(f/O_k)$ is the density function for the j-th cluster group of training samples for the k-th object. Clustered sub-groups of training data for object 2 are also shown in FIG. 6. Then the desired $p(f/O_k)$ can be written as $$P(f/O_k) = \sum_{j=1}^{J_k} b_j^k P_j(f/O_k) \qquad (6)$$

$$b_j^k = \frac{n_j^k}{\sum_{i=1}^{J_k} n_i^k} \qquad (7)$$

where $J_k$ is the number of cluster subgroups for object k, and $n_j^k$ is the number of training samples for object k in the j-th subgroup (from the clustering). The $b_j^k$ is just the probability that a feature vector from object k is in subgroup j.

The only unknown result now is $p_j(f/O_k)$ in equation (6), which is a much simpler density due to the clustering. With proper clustering, each sub-group in FIG. 6 can be approximated as consisting of training data for a uni-modal density function with independent features. These assumptions are grossly in error if the clustering is not utilized. Then from the approximate independence of features within the j-th cluster density:

$$p_j(f/O_k) = p_j(f_1, f_2, \ldots, f_D/O_k) = \prod_{i=1}^{D} P_j(f_i/O_k) \qquad (8)$$

and $$\ln p_j(f/O_k) = \ln \prod_{i=1}^{D} P_j(f_i/O_k) = \sum_{i=1}^{D} \ln p_j(f_i/O_k) \qquad (9)$$

where the natural log (ln) was used in equation (9) to reduce dynamic range and to obtain a summation form for equation (9), which is also the basic form of a neural network.

Next, a Gaussian parametric form is assumed for $p_j(f_i/O_k)$ in equation (9). Again, this often used parametric form would be erroneous if clustering were not first used. With clustering, the Gaussian kernel gives a good approximation to the subgroup of training samples, and the clustering process directly outputs the needed parameters, $m_i^{jk}$ and $\sigma_i^{jk}$, as the mean and standard deviation, respectively for the i-th dimension, j-th sub-group, and k-th object. Thus, the clustering defines $$p_j(f_i/O_k) = \frac{1}{\sqrt{2\pi}\,\sigma_i^{jk}} e^{-(f_i - m_i^{jk})^2/2(\sigma_i^{jk})^2} \qquad (10)$$

Then from equations (5)–(10), the likelihood function in the numerator of equation (5) can be written as $$L(f/O_k) = P_r(O_k) \left[ \sum_{j=1}^{J_k} b_j^k \text{EXP} \sum_{i=1}^{D} G(f_i, m_i^{jk}, \sigma_i^{jk}) \right] \qquad (11)$$

where for notation convenience, $$G(f_i, m_i^{jk}, \sigma_i^{jk}) = -\frac{1}{2} \ln 2\pi - \ln \sigma_i^{jk} - \frac{1}{2}\left(\frac{f_i - m_i^{jk}}{\sigma_i^{jk}}\right)^2 \qquad (12)$$

and $$L(f/O_k) = p(f/O_k)P_r(O_k) \qquad (13)$$

Equation (11) gives an estimate for $p(f/O_k)P_r(O_k)$, which together with equation (5) can be used to estimate the desired $P_r(O_k/f)$.

Therefore, equation (11) is put into the form of a multilayer neural network with saturation and learning weights. Let $a_k = P_r(O_k)$ and $L_{NN}(f/O_k)$ be the neural network approximation of $L(f/O_k)$ in equation (11), where from equations (11)–(13), $$L_{NN}(f/O_k) = a_k F_3\left[ \sum_{j=1}^{J_k} b_j^k F_2\left[ \sum_{i=1}^{D} c_i^{jk} F_1[G(f_i, m_i^{jk}, \sigma_i^{jk})] \right] \right] \qquad (14)$$

Then the corresponding neural network (NN) form of the a posteriori probability $P_{rNN}(O_k/f)$ is given by:

$$P_{rNN}(O_k/f) = \frac{L_{NN}(f/O_k)}{\sum_{l=1}^{K} L_{NN}(f/O_l)} \qquad (15)$$

Equation (14) is in the form of a three-layer neural network (NN) with saturation functions, $F_1$, $F_2$, and $F_3$ and interconnect weights $c_i^{jk}$, $b_j^k$ and $a_k$.

The single $f_i$ inputs into the first layer nodes are each transformed into a weighted Euclidean distance measure (log-Normal function) relative to the mean and standard deviation by the G function. The initial values of $c_i^{jk}$ are all equalized to 1, and $F_1$, $F_2$, $F_3$ are the saturated forms of $F_1(x) = x$, $F_2(x) = e^x$ and $F_3(x) = 0$ if $x < 0$ and $F_3(x) = x$ if $x \geq 0$. Then $P_{rNN}(O_k/f) \approx P_r(O_k/f)$ when $\underline{f}$ is typical of the training data for $O_k$, and $P_{rNN}(O_k/f)$ includes multilayered saturation in the estimate, when $\underline{f}$ is not typical for $O_k$. Each interconnect weight has a physical basis; $a_k$ is an a priori probability, $b_j^k$ is a relative weighting for subgroups of the k-th object type, and $c_i^{jk}$ is the relative weighting for each feature dimension in the j-th subgroup for the k-th object type.

The training data clustering immediately initializes the NN of equation (14), and feedback of results provides learning by adjusting the above parameters. Note that because of the physical basis of the parameters, and because errors can be associated with specific parameters, the feedback learning process is very simple, stable, and converges rapidly.

The MBNN detection process in equation (14) has been applied to the local pattern characterization step 50 utilized in fingerprint classifying. Together with the merge process, Step 52 and global pattern classification Step 54, MBNN provided excellent results as illustrated in Table 3.

TABLE 3

FINGERPRINT TYPE CLASSIFICATION PERFORMANCE WITH REJECTION CRITERIA

|  | Total | Whorl | R-Loop | L-Loop | Arch | Tented Arch |
|---|---|---|---|---|---|---|
| Tested | 379 | 66 | 51 | 97 | 78 | 87 |
| Misclassified | 12 | 2 | 2 | 2 | 3 | 3 |
| Rejection (Rate %) | 20 (5.3) | 1 (2.) | 2 (3.9) | 10 (10.3) | 0 (0.0) | 7 96.6 |
| Accuracy (%) | 96.8 | 97.0 | 96.1 | 97.9 | 96.2 | 96.6 | e. Application of Fuzzy-Logic to the Above Programs

This portion will not go into the same detail which was previously applied to Bayesian logic techniques. The application of fuzzy logic is generally known in the areas of computer control and neural networks. An article which overviews possibilistic fuzzy logic is "Syllogistic Reasoning in Fuzzy Logic and its Applications to Usuality and Reasoning with Dispositions", L. A. Zadeh, IEEE Transactions on Systems, Man, and Cybernetics, Vol. SMC-15, November/December 1985. (Incorporated Herein By Reference).

Using the nomenclature applied in the Zadeh article, the fuzzy predicates are the locations of the curves of the ridges and/or valleys of the fingerprint. The fuzzy quantifiers may be added to produce a statement such as a specific ridge and/or valley configuration is a certain percentage of an angle change pattern (or some other local pattern.) The fuzzy predicates and the fuzzy quantifiers are applied at distinct locations around the fingerprint, similar to the Bayesian techniques as selected by the prescreening step 42 and the feature extraction step 48.

The angle change predicates and quantifiers may be applied to a digital computer utilizing fuzzy logic as known in the Fuzzy logic area (and described in the Zadeh article). From the input of the fuzzy quantifiers and predicates described in the prior paragraph, the fuzzy computer program will output the data that a certain local pattern characterization exists at such a location.

Even though this portion did not go into much detail about fuzzy logic, it is emphasized that many of the tasks which are suitable for Bayesian logic are also suitable for fuzzy logic, and vice versa. Whichever technique is selected should depend upon the expertise of the programmer.

Fingerprint Identification

Up to this point in the disclosure the use of local patterns in fingerprints have only been applied to fingerprint classification into types. This section, by comparison, identifies particular fingerprints as belonging to a single individual. Similar techniques are used as previously described in the Fingerprint Classification portion of this application, but they are modified as described herein. The minutiae 99 of the ridges of a fingerprint, as illustrated in magnified form in FIG. 9, consists of center ridge 100 which ends at end point 102, and bifurcations (forks 106) in the surrounding ridges 108, 110.

Figure 9:
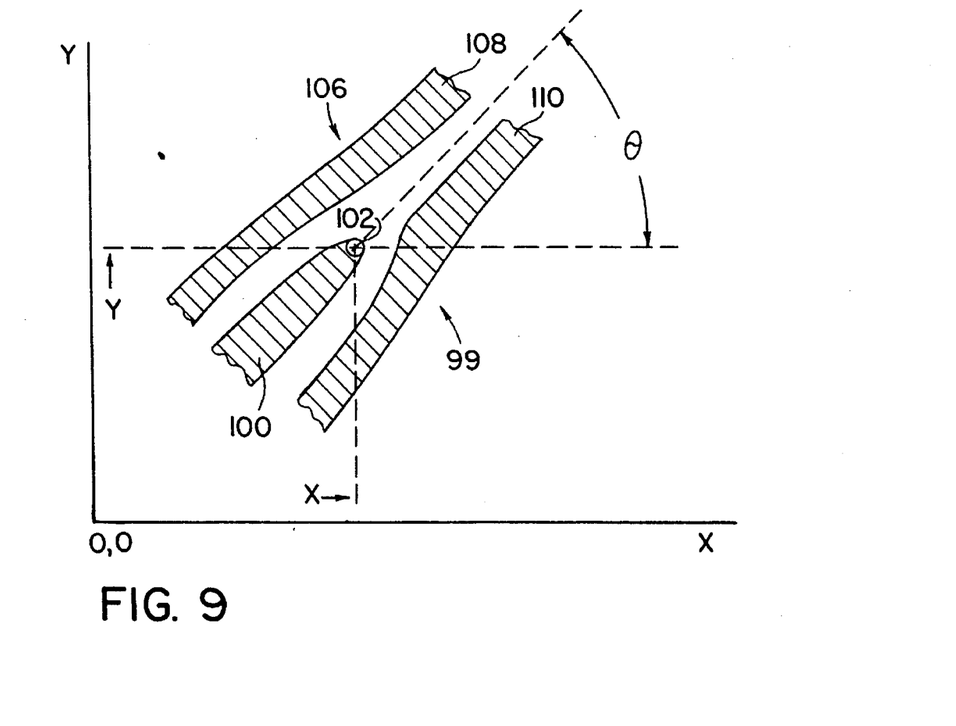
FIG. 9 illustrates an illustration of minutia of fingerprint ridges, as is known in the art and utilized in the present invention.

A distinction is made in this disclosure between minutiae (as illustrated in FIG. 9), and local patterns (as illustrated in FIGS. 7a–7h). Minutiae involve an interaction of a center ridge 100 and two side ridges 108, 110, and the fork-like manner at which they intersect. Local patterns, by comparison, involve an interaction of many ridges, and possibly may have minutiae incorporated within the local pattern. Additionally, the local patterns involve a significant change in angle of the ridges and/or valleys which is detectable by the above described techniques. The minutiae involve little change in the direction of the ridges and/or valleys. Another feature of minutiae that can be used to provide useful information which may be used to identify fingerprints is the angle (Theta—see FIG. 9—that the center ridge 100 makes with the X-Y coordinate system) can vary. Comparison of minutiae locations between two fingerprints is used for fingerprint identification, and comprises an additional step of verifying whether two similar fingerprints are actually identical. Therefore, the process of identifying fingerprints can use the local pattern steps already described in the fingerprint classification portion of this application, and minutiae detection and locating as described herein.

Figure 8:
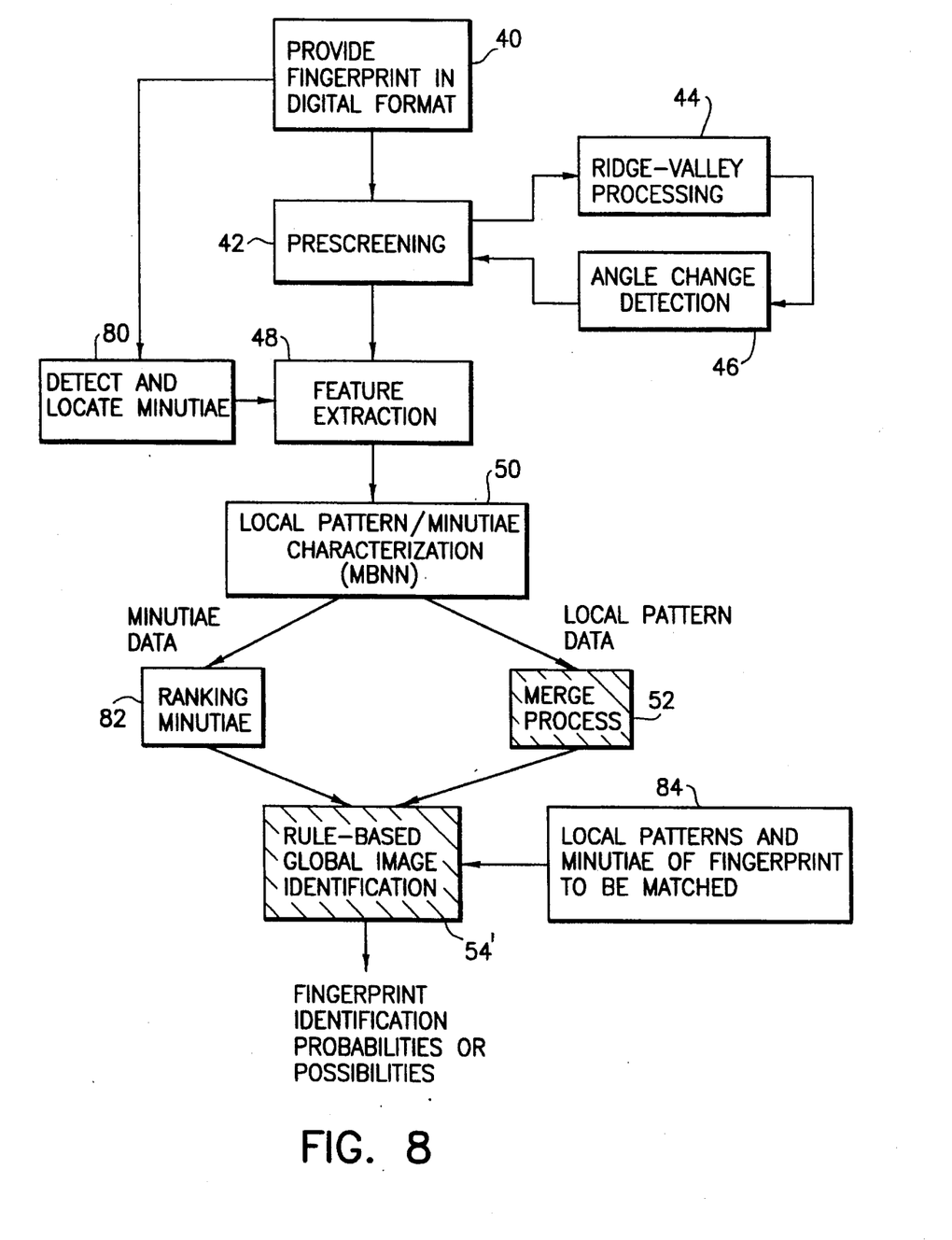
FIG. 8 illustrates a similar flow chart as FIG. 2 of one embodiment of a fingerprint identification system of the present invention.

In comparing the steps utilized in the fingerprint classification technique as outlined in FIG. 2 to the fingerprint identification technique of FIG. 8; the fingerprint identification technique utilizes each step illustrated in FIG. 2, and in addition it uses the Detect and Locate Minutiae Step 80, the Ranking Minutiae Step 82, the Local Patterns and Minutiae of Fingerprint Input 84, and the substitution of the Rule Based Global Image Classification Step 54 by a Rule Based Global Image Identification Step 54'. The output of the FIG. 8 fingerprint identification process produces a fingerprint identity probability or possibility instead of a fingerprint type probability or possibility.

The Detect and Locate Minutiae Step 80 utilizes the data produced by the Provide Fingerprint In Digital Format Step 40 (in FIG. 8) to detect the presence of minutiae, and the precise location thereof. The software and hardware used in the Detect and Locate Minutiae Step 80 is well known in the prior art, and does not, by itself, form a basis for the present invention. Companies which produce systems which may be used in the Detect and Locate Minutiae Step include Logica, Ltd.; De La Rue Printrax, Inc.; Morpho Systems; and NEC Information Systems, Inc. A brief description of the available equipment and the associated processes is included in the text *Advances In Fingerprint Technology*, Edited by H. C. Lee and R. E. Gaensslen, Published by Elsevier Co., Inc. New York, N.Y. (1991) pp 176 to 182 (Incorporated herein by reference). The output of the Detect and Locate Minutiae Step 80 is the X and Y coordinate locations of the end points 102 of each of the center ridges 100 of the minutiae 99, as well as the angle (Theta) of the minutiae itself.

The ranking minutiae step 82 takes the minutiae data output of the Local Pattern and Minutiae Characterization step, (which comprises the a posteriori probability and/or possibility of the minutiae), and ranks the minutiae as to which minutiae provides a greater identification factor. This is performed in a similar manner to how the Local Pattern characterization step 50 uses a MBNN to characterize local patterns as described above.

The output of the Detect and Locate Minutiae Step 80 is inserted into the Feature Extraction Step 48. The reason why it is important to insert this digital information at this location is that it is useful to have a probabilistic (or possibilistic) value for the fingerprint identification, which requires the use of the neural network program (or similar program) as described in the fingerprint characterization section. Therefore, in FIG. 8, the Local Pattern and Minutiae Characterization Step 50 will incorporate not only information relating to the local patterns, but also information relating to the minutiae 99 in determining the probability (or possibility) of fingerprint identification.

One distinction between the global image identification step 54' and the global image classification step 54 is that the rules inserted in the former (which follow the precise mathematical principles of the latter as outlined in the disclosure) relate to a specific fingerprint, not a general type of fingerprints. There must be an input 84 to the global image identification step 54' which describes the minutiae, as well as the local patterns, locations and characteristics. For example, if there is a given local pattern at a specific location (or a highly visible minutiae at a given location with a given angle, defined as input to step 54' from steps 52 or 82, respectively in FIG. 8) and there is no such similar fingerprint present in the fingerprint data from step 84 to step 54', then the possibility of the two fingerprints matching is greatly reduced if not eliminated, even if all of the local patterns of the identified fingerprint and the fingerprint that is being identified are identical. Similarly, if the fingerprint data input into step 54 from the combined steps 52 and 82 are very similar to the data (minutiae and local patterns) stored about a specific fingerprint from step 84, then the probability or possibility of positive fingerprint identification is greatly enhanced. The output from the fingerprint identification process will be a certain probability that a fingerprint match has occurred, instead of a certain probability that a fingerprint is of a specific type. Fingerprint classification and fingerprint identification (as illustrated in FIGS. 2 and 8, respectively) may be performed concurrently such that the user is provided with probabilistic or possibilistic data as to which type fingerprinting it is, and whether it matches any other fingerprints stored in the fingerprint identification portion.

Identification Reliability

One issue in automated fingerprint identification is the reliability of the decisions. There are existing techniques for automatic minutia detection. However, the MBNN detection process can also be used to detect minutiae with a method analogous to that used for the local pattern classification. An advantage of MBNN detection of minutia is the resulting ranking of minutia probability, which enables a selection of the more reliable minutiae (which have a smaller probability of occurring in more than one fingerprint). This application of minutiae ranking enables using a smaller number of more relatable minutiae, and when used in combination with the previously detected local patterns for fingerprint classification, this results in a more reliable determination of match or mismatch in the final fingerprint identification.

Identification Speed

Another important issue in automated fingerprint identification is the speed of minutiae matching decisions. The previously described fingerprint classification stage, which can also be assisted by text information (for example, sex, age, race, etc.), may be applied prior to the fingerprint identification step to greatly reduce the number of candidate matching fingerprints. However, the initial database of fingerprints is often so large that even after a large reduction factor through automated classification, there can still be a very large number of potentially matching fingerprints which require final identification using minutiae. Thus, reliable methods of automated identification are needed which can rapidly search through a large database of fingerprint minutiae and rapidly compute the match of the minutiae for final identification.

This fingerprint identification application describes the locations of the selected minutiae relative to the locations of the previously described local patterns. The coupling of locations for local patterns and selected minutiae enables rapid registration of reference and test minutiae by using the local pattern locations to remove most of the spatial translation, rotation, and scale differences. The rapid registration of selected minutiae, in turn, enables rapid minutia matching for automated fingerprint identification.

Reduced Data Storage and Transfer Time

A final important issue for identification of fingerprints is the efficient representation and storage of the necessary fingerprint information in a database. The number of bytes of data needed to represent the fingerprint affects both the size of the storage medium, and the data transfer time required for identification when searching for a match.

There are two different needs for reduced representations of the fingerprint data. The first need of reduced data is for automated identification. For this function it is only necessary to preserve the unique characteristics of each fingerprint, but not the entire fingerprint image. It is also very important to achieve both a very large data reduction factor and that the reduction be capable of providing for rapid data transfer for the repeated automated identification searches throughout the database. The second need for reduced data storage is for visual identification, or human verification of the automatic identification decisions. This step consists of a human visually comparing the test fingerprint image with one, or a small number, of candidate fingerprint images. The data storage reduction factor is still important, but not as important as for automated identification, because there is not a need for rapid transfer rates or rapid searches through the fingerprint images. The following describes how the present invention uniquely provides for extremely rapid transfer rates of the fingerprint data for both automated and visual identification.

Instead of storing the whole fingerprint in the database as was the case with the prior art fingerprint identification and classifying techniques, the automated processes presently described in the Fingerprint Classification and Identification sections of this application need only store the locations and probabilities of the small number of local patterns and high ranking minutiae when used for fingerprint identification. The combination of both the local patterns and selected minutiae are all that are needed for reliable classification and identification. In doing so, the necessary storage of data is greatly reduced by using the techniques of the present invention. Let a fingerprint image consist of 512×512 picture elements which can require more than 250,000 bytes of data storage using prior art techniques. Alternately, the small number of local patterns and high ranking minutiae information for a print can be stored in about 25 bytes of data (with the data defining the local pattern characteristics and locations; and the minutiae location and orientation). Therefore, the data compression ratio is as high as 10,000:1 (typically between 1000:1 and 10,000:1). For 30 million ten-print cards, this method reduces the total data storage required for automated classification and identification from about 100,000 GBytes to 10 GBytes. In addition, this technique for representing the fingerprint data also reduces the data transfer time by a factor of 10,000 when searching for classification and identification matches. The factor of 10,000 can reduce data transfer time required for matching a print in certain digital computers from nearly 3 hours to 1 second.

Reduced Storage for Visual Identification

The above techniques of the present invention may also be applied for achieving reduced storage for visual identification. Instead of storing the whole fingerprint image in the database, the automated process presently described in the Fingerprint Classification and Identification sections of this disclosure store the local patterns and minutiae of the fingerprint. Since visual identification requires the ability to reconstruct a close approximation of the original fingerprint image, virtually all significant minutiae are utilized, and additional scale and angle factors which more precisely describe the size and configuration of the fingerprint may be included in the description of each local pattern and minutiae. Thus the technique is the same as for reducing data storage with automated identification except for the increased number and more detailed descriptions of the local patterns and minutiae.

The final adjustment of the local pattern and minutiae parameters are also defined by a feedback error comparison between the images reconstructed from the reduced representation and the original image being compressed and approximated. This feedback comparison also enables separate representing of infrequently occurring small areas of irregular fingerprint detail. The added number and detailing of the local patterns and minutiae enable reconstruction of the full fingerprint image for visual verification. Of course, this extra definition reduces the data storage reduction factor. Instead of 1000:1 to 10,000:1 as in automated identification, the factor reduces to about 100:1 to 1000:1. This smaller reduction factor is still a large reduction compared to the prior art in the area of image data compression.

Identification Summary

The fingerprint identification portion of this application possesses a unique combination of minutiae ranking and location description through local pattern classification. The combined use of local patterns and ranked minutiae provide the ability to greatly reduce data storage of reference prints, and the ability to reliably register and match reference and test prints. Furthermore, it enhances the speed to identify the test fingerprints by matching only high ranking minutiae at known locations defined by the registration of the local patterns. The identification technique provides several unique advantages over the prior art, which are listed as follows:

1. reliable fingerprint identification using local patterns and ranked minutiae in place of using the pattern of the entire fingerprint;
2. greatly reduced data storage and data transfer time for reference prints; and
3. significantly improved speed in minutiae registration and matching for fingerprint identification.

While this disclosure has described fingerprint classification (FIG. 2) and fingerprint identification (FIG. 8) as involving two distinct programs; the local pattern obtaining portions of both fingerprint classification and fingerprint identification are identical. For this reason, some steps of the two programs need to be computed only once to suffice for both classification and identification. It is possible for the classification portion to be run first to determine the fingerprint classification type, and then the identification portion can be run using only the potentially matching fingerprints of the same classification type. This process would reduce the number of fingerprints (and also reduce the amount of data processing) involved in the fingerprint identification process. Any such combination of fingerprint identification and fingerprint classification is within the scope of the present invention.

The above set forth description provides presently preferred embodiments of this invention. It is intended that the present invention incorporate not only those features specifically described in the specification, but those features which, as outlined by the claims, would be within the scope of the knowledge of a person having ordinary skill in the art.

What is claimed is:

1. A method for processing data representing an image of a fingerprint, comprising the steps of:

prescreening the data to determine locations of regions of interest in the fingerprint data;

for a determined location of a region of interest, extracting a set of feature vectors within an area that includes the determined location;

applying the extracted set of feature vectors to a plurality of input nodes of a multi-layer neural network, the plurality of input nodes comprising an input layer for inputting the extracted set of feature vectors, the multi-layer neural network further comprising a multi-node output layer, and at least one multi-node hidden layer, the multi-layer neural network operating in accordance with a set of weighting functions that are mapped onto said multi-layer neural network for weighting inputs to the plurality of input nodes, for weighting inputs to the nodes of the at least one hidden layer, and for weighting inputs to the nodes of the output layer;

from an output of the multi-layer neural network, determining a set of probabilities that the set of feature vectors represent individual ones of a plurality of predetermined local pattern types; and determining in accordance with a rule based classification technique, from most probable ones of the local pattern types for the identified regions of interest, and also from locations of the local pattern types within the image of the fingerprint, a most probable fingerprint type that the fingerprint data represents;

wherein the step of applying includes a preliminary step of predetermining values of individual ones of the set of weights in accordance with a supervised, Bayesian model-based training sequence wherein features indicative of a predetermined set of fingerprint local pattern types are clustered within a feature space, wherein the multi-layer neural network operates in accordance with the expression:

$$L_{NN}(f/O_k) = a_k F_3 \left[ \sum_{j=1}^{J_k} b_j^k F_2 \left[ \sum_{i=1}^{d} c_i^{jk} F_1[G(f_i, m_i^{jk}, \sigma_i^{jk})] \right] \right]$$

wherein the step of determining a set of probabilities operates in accordance with the expression:

$$P_{rNN}(O_k/f) = \frac{L_{NN}(f/O_k)}{\sum_{l=1}^{K} L_{NN}(f/O_l)}$$

in which expressions $P_{rNN}(O_k/f)$ is the Bayesian a posteriori probability estimate for object $O_k$; $a_k$ is the a priori probability; $F_1$, $F_2$, $F_3$ are the saturated forms of $F_1(x)=x$, $F_2(x)=e^x$, and $F_3(x)=0$ if $x<0$ and $F_3(x)=x$ if $x \geq 0$; $b_j^k$ is the subgroup weightings; $c_i^{jK}$, $m_i^{jK}$, and $\sigma_i^{jK}$ are respectively the relative weightings of the features $f_i$, the mean, and the standard deviation of the feature training values for feature $f_i$ in subgroup $j$ of the k-th object, and in which $F_1$, $m_i^{jK}$ and $\sigma_i^{jK}$ are associated with the input layer of the neural network, $F_2$ and $c_i^{jK}$ are associated with the at least one hidden layer of the neural network and $F_3$ and $b_j^K$ are associated with the output layer of the neural network; and wherein the function that applies weights to the plurality of input nodes of the multi-layer neural network is given by the expression:

$$G(f_i, m_i^{jk}, \sigma_i^{jk}) = -\frac{1}{2} \ln 2\pi - \ln \sigma_i^{jk} - \frac{1}{2} \left( \frac{f_i - m_i^{jk}}{\sigma_i^{jk}} \right)^2.$$

2. A method as set forth in claim 1, wherein the step of determining a most probable fingerprint type includes a step of considering also a location of minutiae within the fingerprint image data.

3. A method as set forth in claim 1, wherein the step of extracting a set of feature vectors extracts a plurality of feature vectors that are centered on the determined location.

4. A method as set forth in claim 1, wherein said prescreening step includes the steps of performing ridge-valley processing and angle change detection processing.

* * * * *